United States Patent [19]

Nishii et al.

[11] Patent Number: 5,083,432
[45] Date of Patent: Jan. 28, 1992

[54] TANDEM MASTER CYLINDER WITH A THIRD PISTON AND CHAMBER

[75] Inventors: Michiharu Nishii, Toyota; Genji Mizuno, Toyoake, both of Japan

[73] Assignee: Aisin Seiki Kabushiki Kaisha, Kariya, Japan

[21] Appl. No.: 470,688

[22] Filed: Jan. 26, 1990

[30] Foreign Application Priority Data

Jan. 31, 1989 [JP] Japan .................. 1-22192

[51] Int. Cl.⁵ .............................. F15B 7/00
[52] U.S. Cl. .................... 60/560; 60/549; 60/576; 60/579
[58] Field of Search .......... 60/547.1, 549, 560, 60/574, 576, 579, 582, 593

[56] References Cited

U.S. PATENT DOCUMENTS

| | | | |
|---|---|---|---|
| 4,225,022 | 9/1980 | Belart | 60/549 X |
| 4,702,530 | 10/1987 | Belart et al. | 60/547.1 X |
| 4,729,609 | 3/1988 | Seibert et al. | 60/547.1 X |
| 4,800,724 | 1/1989 | Asahara et al. | 60/560 |
| 4,876,853 | 10/1989 | Shirai et al. | 60/547.1 |
| 4,891,945 | 1/1990 | Becker | 60/547.1 |
| 4,949,542 | 8/1990 | Pruett | 60/593 X |

FOREIGN PATENT DOCUMENTS 59-209948 11/1984 Japan .
59-227552 12/1984 Japan .
62-155167 8/1987 Japan .

Primary Examiner—Edward K. Look
Assistant Examiner—John Ryznic
Attorney, Agent, or Firm—Doane, Swecker & Mathis Burns

[57] ABSTRACT

A hydraulic braking system includes the third piston slidably disposed between the first piston and the second piston of the tandem master cylinder so as to define the third pressure chamber between the third piston and second piston. The third pressure chamber is communicated with the dynamic hydraulic pressure generator. Thereby, due to supply the output hydraulic pressure of the dynamic hydraulic pressure generator to the third pressure chamber, the initial stroke of the brake pedal is reduced and the braking force is ensured as the ordinaly tandem master cylinder when the dynamic hydraulic pressure generator is not operated. Moreover, if the leakage of the brake fluid generates in the wheel cylinders, the flow of the brake fluid of the dynamic hydraulic pressure generator does not generate.

10 Claims, 1 Drawing Sheet

Fig. 2 ed to the

TANDEM MASTER CYLINDER WITH A THIRD PISTON AND CHAMBER

BACKGROUND OF THE INVENTION

1. Field of the Invention

The present invention relates to a braking system for use in an automotive vehicle and particularly to a hydraulic braking system comprising a tandem master cylinder and a dynamic hydraulic braking pressure generator which outputs hydraulic power pressure supplied from a power source in response to the depression of a brake pedal.

2. Description of the Prior Art

In a conventional service braking system for an automotive vehicle, there are provided a plurality of hydraulic circuits connecting wheel brake cylinders mounted on road wheels with a hydraulic braking pressure generator such as a master cylinder, so that when one of the hydraulic circuits is broken, the braking operation is achieved by the rest of the hydraulic circuits. In general, a tandem master cylinder is used in conventional dual circuits system.

In order to reduce the force required to operate a brake pedal in the braking operation, the hydraulic braking system is provided with a servo unit which is referred to as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal. For example, the Japanese patent Laid-open publication No. 59-209948 discloses a system providing the hydraulic booster to the tandem master cylinder which will operate as the ordinary tandem master cylinder when the hydraulic booster is not operated.

With employment of such a hydraulic booster, it has been proposed to employ the hydraulic generated as a dynamic hydraulic pressure generator in addition to the master cylinder. In other words, a hydraulic pressure boosted by the booster (hereinafter referred to as the boost pressure) in response to the depression from the brake pedal is applied directly to a hydraulic circuit. For example, as shown in Japanese Patent Laid-open publication No. 59-227552, boost pressure of the hydraulic booster is applied to rear wheel brake cylinders in a front-rear dual circuits system in order to reduce the stroke of the brake pedal.

Further, regarding the hydraulic braking pressure generator provided with the tandem master cylinder and the hydraulic booster, it has been proposed to connect one of the pressure chambers of the tandem master cylinder with the wheel cylinders of one of the hydraulic circuits and to output the boost pressure of the hydraulic booster to the wheel cylinders of the other hydraulic circuits via the other pressure chamber of the tandem master cylinder. Such a hydraulic braking system is disclosed in Japanese Patent Laid-open publication No. 62-155167. According to this system, the various effects such as the shortening of the stroke of the brake pedal and so on are obtained.

In the above described prior art, (Japanese Patent Laid-open publication No. 59-227552), however, since the boost pressure of the hydraulic booster, namely the dynamic hydraulic pressure is directly supplied to the rear wheel cylinders, if the loss is generated at the rear wheel cylinders or the hydraulic conduit connecting with the rear wheel cylinders, there is a danger of the flow of the brake fluid filling up the power pressure circuit, including the hydraulic booster. And then, in the prior art, (Japanese Patent Laid-open publication No. 62-155167), the boost pressure, namely the dynamic hydraulic pressure is directly supplied to the wheel cylinders of the other hydraulic circuits. Accordingly, the flow of the brake fluid in the normal side is generated by the communication between the wheel cylinders and the dynamic hydraulic braking pressure generator when either of the wheel cylinder or the dynamic hydraulic braking pressure generator is lost.

SUMMARY OF THE INVENTION

It is, therefore, an object of the present invention to reduce the stroke of the brake pedal by applying the braking force to the wheel cylinders of one circuit using the output pressure of the dynamic hydraulic braking pressure generator and to ensure the normal operation of the dynamic hydraulic braking pressure generator when a fluid loss is generated in the wheel cylinders side of the circuits.

It is another object of the present invention to reduce the stroke of the brake pedal by applying the braking force to the wheel cylinders of the one circuit using the output pressure of the dynamic hydraulic braking pressure generator and to prevent the flow of the brake fluid from the dynamic hydraulic braking pressure generator when the fluid loss is generated in the wheel cylinders side of the circuits.

It is a further object of the present invention to reduce the stroke of the brake pedal by applying the braking force to the wheel cylinders of one circuit using the output pressure of the dynamic hydraulic braking pressure generator and to ensure brake operation due to the tandem master cylinder while the dynamic hydraulic braking pressure generator is not operated.

In order to achieve these objects, there is provided an improved hydraulic braking system which includes a tandem master cylinder having a bore with an opening and a closed wall at opposite ends thereof, a first piston slidably fitted in the bore and operatively connected to a brake pedal, a second piston slidably fitted in the bore and operatively connected to the first piston, a first pressure chamber and a second pressure chamber defined in the bore by the first piston and the second piston and which output the braking pressure by being decreased in volume when each piston is slid in response to the depression of the brake pedal, a power source for generating a hydraulic power pressure, a dynamic hydraulic braking pressure generator which introduces the hydraulic power pressure output from the power source and outputs the output pressure regulated in response to depression of the brake pedal, a plurality of wheel cylinders for braking respective road wheels, divided into a first group of wheel brake cylinders communicated with the first pressure chamber through one of the hydraulic circuits and a second group of wheel brake cylinders communicated with the second pressure chamber through another of the hydraulic circuits, and a third piston slidably fitted between the first piston and the second piston in the bore so as to define a third pressure chamber communicated with the dynamic hydraulic braking pressure generator between the third piston and the second piston.

BRIEF DESCRIPTION OF THE DRAWINGS

Additional objects and advantage of the present invention will become more apparent from the following detailed description of preferred embodiments thereof when considered with reference to the attached drawings, in which:

FIG. 1 is a schematic illustration of a hydraulic braking system of an embodiment of the present invention; and FIG. 2 is a sectional view of a pressure difference operated valve of an embodiment of valve means in the other embodiment of the present invention.

DESCRIPTION OF THE PREFERRED EMBODIMENTS

A hydraulic braking system constructed in accordance with one of the embodiments of the present invention will be described with reference the the drawings.

Figures 1, 2:
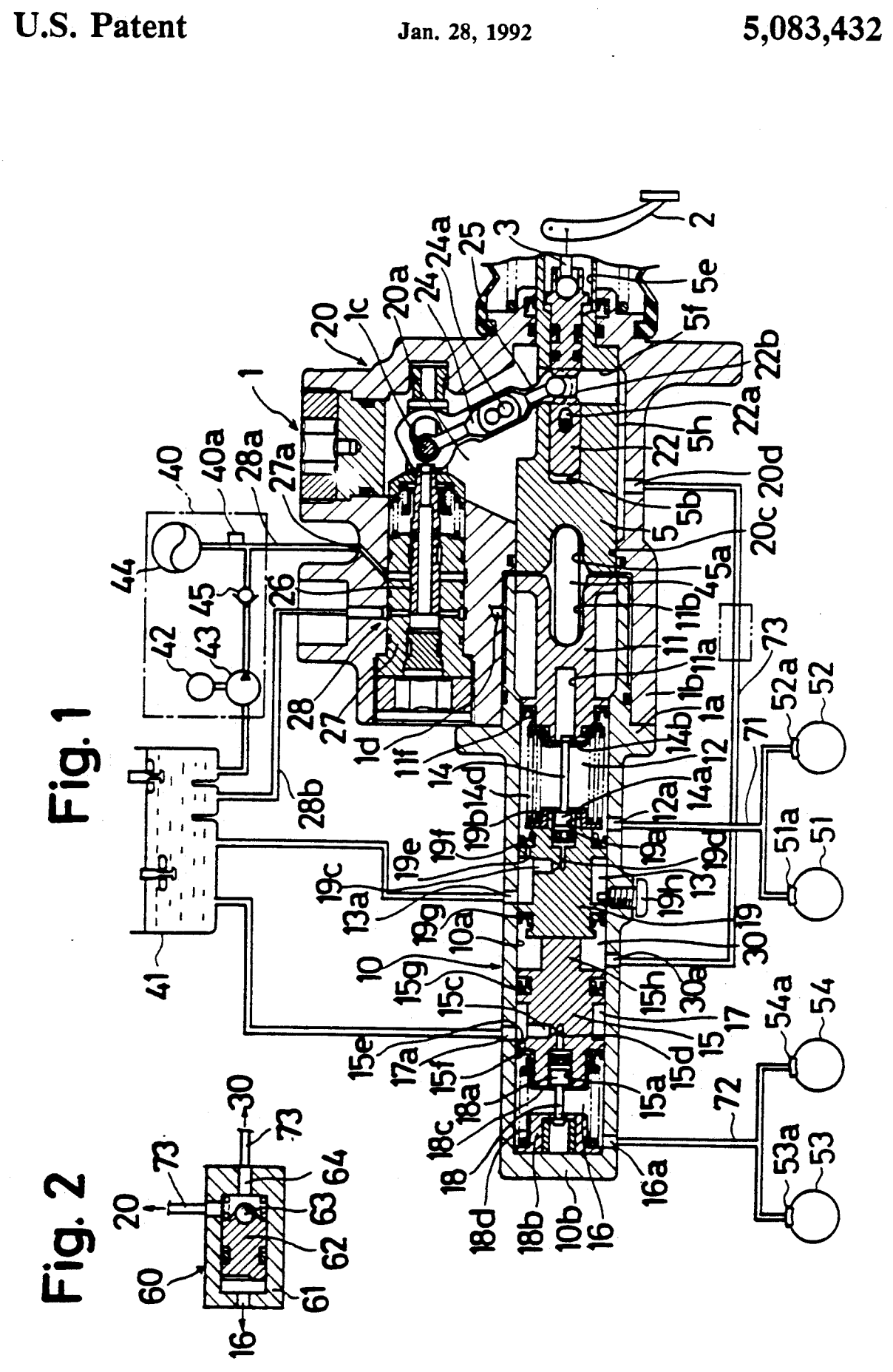

Referring to FIG. 1, there is schematically illustrated a hydraulic braking pressure generator 1 which includes a tandem master cylinder 10 and a hydraulic booster 20. This hydraulic booster 20 is utilized as a dynamic hydraulic braking pressure generator of the present invention. As a result, a depression force applied on a brake pedal 2 is transmitted as a brake operating force to an input rod 3, and in response to this brake operating force, hydraulic pressure introduced from a power source 40 or a reservoir 41 is appropriately regulated and applied to wheel cylinders 51a and 52a (53a and 54a) of front wheels 51 and 52 (rear wheels 53 and 54) through a first hydraulic passage 71 (a second hydraulic passage 72).

The tandem master cylinder 10 includes a housing 1a with a bore 10a. In the bore 10a, a first piston 11 and a second piston 15 are slidably and fluid-tightly fitted, and also a third piston 19 is slidably and fluid-tightly fitted between the first piston 11 and the second piston 15. At opposite ends of the first piston 11, there are formed a large-diameter land and a small-diameter land. A right side of the bore 10a is formed into a stepped configuration so as to receive the first piston 11. A cup seal 11f is fitted on the small-diameter land of the first piston 11 and the small-diameter land of the first piston 11 is slidably and fluid-tightly received in a small-diameter bore of the bore 10a. A large-diameter bore of the bore 10a is communicated with the reservoir 41 via a port 1d.

The first piston 11 has holes 11a and 11b extending axially from its opposite ends towards its center, respectively. A large-diameter end portion of a valve rod 14 is movably received in the hole 11a and is restricted from moving towards the third piston 19 by a retainer 14b mounted on the first piston 11. An output rod 4 is received in the hole 11b.

At opposite ends of the third piston 19, there are formed lands, respectively, the cup seals 19f and 19g are fitted on the lands, respectively. Thereby, a first fluid chamber 13 is defined between both lands of the third piston 19 in the bore 10a and a first pressure chamber 12 is defined between the cup seal 19f and the cup seal 11f of the first piston 11 in the bore 10a. This first pressure chamber 12 is communicated with the wheel cylinders 51a and 52a via a port 12a and the first hydraulic passage 71, and the first fluid chamber 13 is communicated with the reservoir 41 via a port 13a.

The third piston 19 has a hole 19a formed axially and opening into the first pressure chamber 12 and a hole 19c formed radially and opening into the first fluid chamber 13. The hole 19a is communicated with the hole 19c via a hole 19d formed axially. A valve member 14a mounted on an one end of the valve rod 14 is movably received in the hole 19a of the third piston 19 in opposing relation to the hole 19d, and the valve member 14a is restricted from moving towards the first piston 11 by a retainer 19b mounted on the third piston 19. Axial holes 19e are formed in the land of the third piston 19 of the first pressure chamber 12 side and opening ends of the holes 19e of the first pressure chamber 12 side are covered by the cup seal 19f. As a result, a check valve is constituted by holes 19e and cup seal 19f. A spring (not shown) is disposed between the retainer 19b and the valve member 14a so as to urge the valve member 14a toward the hole 19d.

A pair of return springs 14d are interposed between the retainer 19b of the third piston 19 and the retainer 14b of the first piston 11. Thereby, the first piston 11 and the third piston 19 are urged so as to separate from each together. Accordingly, both ends of the valve rod 14 are engaged with the retainers 14b and 19b in non-operating position, respectively. At this time, due to space between the valve member 14a from the hole 19d, the brake fluid supplied from the reservoir 41 to the fluid chamber 13 via the port 13a is filled in the first pressure chamber 12 via the hole 19e or via the hole 19c, the hole 19d and the hole 19a. And then, when either the first piston 11 or the third piston 19 is slided against the return spring 14d so as to approach each other, the holes 19e are closed by the cup seal 19f and the hole 19d is closed by the valve member 14a. Thereby, the first pressure chamber 12 is shut except for the output hole of port 12a.

The end surface of the third piston 19 of the cup seal 19g sides opposite to a projecting portion 15h which is formed at one end surface of the second piston 15. The other end surface of the second piston 15 is opposite to a closed end portion 10b of the bore 10a. At opposite ends of the second piston 15, there are lands, respectively, and cup seals 15f and 15g are fitted on the lands, respectively. Thereby, a second fluid chamber 17 is defined between both lands and a second pressure chamber 16 is defined between the cup seal 15f and the closed end portion 10b. This second pressure chamber 16 is communicated with the wheel cylinders 53a and 54a via a port 16a and the second hydraulic passage 72, and the second fluid chamber 17 is communicated with the reservoir 41 via a port 17a.

The second piston 15 has a hole 15a formed axially and opening into the second pressure chamber 16 and a hole 15c formed radially and opening into the second fluid chamber 17. The hole 15a is communicated with the hole 15c via a hole 15d formed axially. Axial holes 15e are formed in the land of the third piston 15. The holes 15e are covered by the cup seal 15f. As a result, a check valve is constituted by holes 15e and cup seal 15f. A valve member 18a mounted on one end of the valve rod 18 is movably received in the hole 15a of the second piston 15 in opposing relation to the hole 15d, and the valve member 18a is restricted from moving towards the closed end portion 10b by a retainer 18c mounted on the second piston 15. A spring (not shown) is disposed between the retainer 18c and the valve member 18a so as to urge the valve member 18a towards the hole 15d.

A large-diameter end portion of the other end of the valve rod 18 is movably supported by a retainer 18b and is restricted from moving towards the second piston 15 by the retainer 18b. A return spring 18d is disposed between the retainer 18b and the retainer 18c. Thereby, the second piston 15 is urged by the return spring 18d so as to separate the second piston 15 from the closed end portion 10b and the projection portion 15h contacts with the surface of the third piston 19. Accordingly, both ends of the valve rod 18 are engaged with the retainers 18b and 18c in a non-operating position, respectively and the valve member 18a separates from the hole 15d. The brake fluid supplied from the reservoir 41 to the fluid chamber 17 via the port 17a is filled in the second pressure chamber 16 via the hole 15e or via the hole 15c, the hole 15d and the hole 15a. When the second piston 15 is slid against the return spring 18d, the hole 15e is closed by the cup seal 15f and the hole 15d is closed by the valve member 18a. Thereby, the second pressure chamber 16 is shut except for the output hole of the port 16a.

In the bore 10a, a third pressure chamber 30 is defined between the second piston 15 and the third piston 19, and the third pressure chamber 30 is communicated with a port 20d of the hydraulic booster 20 which will be detailed later via a port 30a and a third hydraulic passage 73. When the hydraulic power pressure is not supplied from the hydraulic booster 20 to the third pressure chamber 30, the projection portion 15h contacts with the third piston 19 as shown in FIG. 1 and the circular third pressure chamber 30 is formed. Therefore, the volume of the third pressure chamber 30 becomes the minimum value. When the hydraulic power pressure is supplied from the hydraulic booster 20 to the third pressure chamber 30, the third pressure chamber 30 is expanded and the second piston 15 and the third piston 19 are moved away from each other, respectively. A bolt 19h is radially screwed into the housing 1a as a limiting means for limiting the movement of the third piston 19 to a predetermined distance toward the first piston 11. The bolt 19h is extended in the bore 10a and is diposed so as to be able to engage with the land of the third piston 19. The above predetermined distance is established to be more than the necessary axial moving distance in order to close the hole 19d by the valve member 19a.

In a housing 1b joined with the housing 1a, a boost chamber 20a of the hydraulic booster 20 is defined, and a power piston 5 is fluid-tightly and slidably disposed in a bore 20c which is substantially coaxial with the cylinder bore 10a. The power piston 5 is provided with a retainer (not shown) at its end extending toward the brake pedal 2, and a spring is mounted between the retainer and the housing 1b so as to normally urge the power piston 5 toward the brake pedal 2. The power piston 5 has at its middle portion a shoulder portion which abuts on the housing 1b to restrict the power piston 5 from sliding toward the brake pedal 2.

In the power piston 5, a recess 5a is formed at the end facing the first piston 11, and a stepped bore is formed axially in the center. This stepped bore comprises a small diameter bore 5b and a large-diameter bore 5e. In the small diameter bore 5b, the reaction piston 22 is slidably received, and a space formed between the bottom surface of the small diameter bore 5b and the head portion of the reaction piston 22 is communicated with the boost chamber 20a.

In the reaction piston 22, an elongated hole 22a is formed extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restricted from sliding at least toward the brake pedal 2 with respect to the power piston 5. One end of an input rod 3 is connected to the brake pedal 2, and the other end of the input rod 3 is provided with a spherical head which is inserted in the large diameter bore 5e of the power piston 5 and received in the recess of the reaction piston 22, and which is engaged with the projection formed on the inner surface of the recess. In the power piston 5 is a radial through-hole 5f which is aligned with the through-hole 22b when the reaction piston 22 is positioned most closely to the brake pedal 2 and which is larger in diameter than the through-hole 22b. The output rod 4 is received in the recess 5a of the power piston 5.

A support lever 24 is pivotally connected at its one end to the housing 1b by a pin 1c for pivotal movement within the boost chamber 20a, and a spherical head of the support lever 24 is fitted into a through-hole 22b of the reaction piston 22. A control lever 25 is pivotally connected with the support lever 24 by a pin 24a approximately in its center, and one head of the control lever 25 is fitted into the through-hole 5f of the power piston 5. In the other end of the control lever 25, a hole is formed around the pin 1c of the support lever 24. Accordingly, when the reaction piston 22 slides toward the output rod 4 with respect to the power piston 5 which is pressed toward the brake pedal 2, a rotating force is exerted on the support lever 24 so as to pivotally move the support lever 24 clockwise about the pin 1c. At this time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to movement of the reaction piston 22 until it comes into contact with the bottom surface of the small diameter hole 5b.

The housing 1b has a spool-valve bore extending substantially in parallel with the power piston 5 and communicating with the boost chamber 20a, and a spool valve 28 which functions as a hydraulic pressure control valve is fitted into the spool-valve bore. The spool valve 28 has a spool 26 slidably received in a spool bore formed in a cylinder 27 substantially in parallel with the power piston 5. The spool valve 28 is operated by the control lever 25 and the hydraulic power pressure of the power source 40 supplied to the boost chamber 20a via a port 27a and a power passage 28a is controlled to the prescribed pressure. The boost chamber 20a is communicated with the reservoir 41 when the hydraulic booster 20 is in its initial position, and the boost chamber 20a is also communicated with the reservoir 41 through a drain passage 28b for returning the superfluous brake fluid when the hydraulic pressure of the boost chamber 20a is at the boost pressure. Also, the port 20d which is formed in the housing 1b so as to communicate with the boost chamber 20a is in fluid communication with the third pressure chamber 30 of the tandem master cylinder 10 via the port 20d, the third hydraulic passage 73 and the port 30a.

The power source 40 comprises an accumulator 44 for generating a hydraulic power pressure along with a fluid pump 43 which is connected to the accumulator 44 via a check valve 45 and connected to the reservoir 41 which stores an amount of hydraulic fluid. The power source 40 is constructed so as to supply the power hydraulic pressure to the necessary place via the accumulator 44. The fluid pump 43 is operated by a motor 42 which is actuated by an electric control signal from an electric control device (not shown). Namely, the power hydraulic pressure is maintained at the predetermined value by means of being intermittently controlled by the motor 42 by the electric control device in response to the electric control signal from a pressure sensor 40a.

The above-described embodiment of the hydraulic braking system 1 operates as follows. FIG. 1 shows a condition under which the brake pedal 2 is not depressed. In this condition, since the first fluid chamber 13 is communicated with the reservoir 41, which is in fluid communication with the first pressure chamber 12, which is communicated with the wheel cylinders 51a and 52a of the rear wheel 51 and 52, the brake fluid which is filled therein (in one of the hydraulic circuits) is at the pressure in the reservoir 41, namely atmospheric pressure. Also, since the brake fluid in the second pressure chamber 16 and the second fluid chamber 17 is in fluid communication with the reservoir 41 via the port 17a and is at the atmospheric pressure, the brake fluid in the wheel cylinders 53a and 54a, which is communicated with the second pressure chamber 16, via the port 16a and the second hydraulic passage 72 is also at the same pressure. When the power source 40 is operated, the hydraulic power pressure of the power source 40 is supplied to the hole 27c. But, in this condition, since the hole 27a is shut, the hydraulic booster 20 is not operated.

When the brake pedal 2 is depressed, the reaction piston 22 is pushed via the input rod 3. When the reaction piston 22 is moved until the reaction piston 22 abuts the power piston 5, the control lever 25 is rotated counterclockwise about the pin 24a with respect to the support lever 24 so that the head of the control lever 25 pushes the spool 26. Thereby, the hydraulic power pressure from the power source 40 is introduced into the boost chamber 20a to push the power piston 5 so as to apply the boost force to the first piston 11 so that the reaction force is transmitted to the brake pedal 2 via the reaction piston 22.

At the same time, the hydraulic power pressure is supplied from the port 20d to the third fluid chamber 30 via the third hydraulic passage 73. Thereby, the third pressure chamber 30 is expanded, and the third piston 19 slides toward the first piston 11 and the second piston 15 is slided toward the bottom end 10b. As a result, the valve members 14a and 18a close the holes 19d and 15d, respectively. The third piston 19 is slides until the third piston 19 abuts on the bolt 19h, whereby the volume of the first pressure chamber 12 is decreased and the initial brake fluid of the wheel cylinders 51a and 52a communicated with the first pressure chamber 12 is filled up therein, and the hydraulic brake pressure is output to the wheel cylinders 51a and 52a as soon as the first piston 11 begins sliding in response to the power piston 5. During this time, the second piston 15 is operated the same as the first piston 11 and the initial brake fluid of the wheel cylinders 53a and 54a is filled up therein. Thereby, the initial stroke of the brake pedal 2 is reduced and the light brake feeling is obtained.

One side, the hydraulic pressure of the boost chamber 20a is at the predetermined boost pressure by the spool valve 28 operated by the control lever 25 in response to relative displacement of the power piston 5 to the reaction piston 22. And then, the first piston 11 slides with respect to the third piston 19 held under the condition abutting on the bolt 19h by the operation of the power piston 5 in response to the operation of the brake pedal 2 and the volume of the first pressure chamber 12 decreases. Furthermore, the second piston 15 slides in response to the output hydraulic pressure of the hydraulic booster 20 (the hydraulic pressure of the third pressure chamber 30 which is supplied from the boost chamber 20a) and the volume of the second pressure chamber 16 decreases. As a result, the hydraulic brake pressure is output to the wheel cylinders 51a to 54a.

For example, when the hydraulic power pressure ceases by the trouble and so on of the power source 40 and the boost pressure ceases by a stoppage in operation of the hydraulic booster 20, the projection portion 15h of the second piston 15 contacts with the third piston 19 in the master cylinder 10. And then, when the first piston 11 slides in response to the brake pedal 2, the second piston 15 and the third piston 19 are moved in a body. Therefore, the hydraulic pressure of the first pressure chamber 12 and the hydraulic pressure of the second pressure chamber 16 rise up and the hydraulic braking system functions as a ordinary tandem master cylinder. Even though the leakage of the brake fluid generates in the hydraulic booster 20 side, since the third pressure chamber 30 does not communicate with the first pressure chamber 12 and the second pressure chamber 16, the brake fluids of the first pressure chamber 12 and the second pressure chamber 16 does not flow.

Furthermore, for example, the leakage of the brake fluid generates in either the wheel cylinders 51a to 54a or the hydraulic passages 71 and 72, the brake fluid of the hydraulic booster 20 does not flow. Accordingly, the boost pressure of the hydraulic booster 20 is held and the hydraulic brake pressure is output from the pressure chamber of the normal side in the first pressure chamber 12 and the second pressure chamber 16. Thereby, it is able to ensure the predetermined braking force.

Next, another embodiment of the hydraulic braking system of the present invention is explained. In the condition under which the third pressure chamber 30 is expanded by the output hydraulic pressure of the hydraulic booster 20 in FIG. 1, when the output hydraulic pressure of the hydraulic booster 20 is lower than the hydraulic pressure of the second pressure chamber 16, the third piston 19 advances until the third piston 19 abuts on the second piston 15. Therefore, the stroke of the brake pedal 2 suddenly increases. Thereby, it is able to detect the trouble of the hydraulic booster 20 side by the feeling of the brake pedal 2. However, there is a case which wish to avoid a sense of incongruity with respect to the brake pedal 2.

So, in this embodiment, the hydraulic braking system is constructed so as to hold the second piston 15 and the third piston 19 at the condition when the hydraulic pressure of the second pressure chamber 16, what is called the static hydraulic pressure is larger than the hydraulic pressure of the third pressure chamber 30, what is called the dynamic hydraulic pressure. Namely, a differential pressure valve 60 as shown in FIG. 2 is disposed in the hydraulic passage 73 as a valve means for suitably opening and closing the hydraulic passage 73.

The differential pressure valve 60 of FIG. 2 shows an example which is able to most easily constitute in the various valve means for opening and closing the hydraulic passage 73 in response to the differential pressure between the static hydraulic pressure and the dynamic hydraulic pressure. This differential pressure valve 60 includes a piston 62 sliding in a cylinder 61 and a spherical shaped valve member 63 formed on one end of the piston 62. A first valve chamber defined between the other end of the piston 62 and the cylinder 61 is communicated with the second pressure chamber 16 and a second valve chamber defined between the one end of the piston 62 and the cylinder 61 is communicated with the boost chamber 20a of the hydraulic booster 20 and the third pressure chamber 30. Namely, the differential pressure valve 60 is constructed as a normal-open valve in which a hydraulic passage 64 communicated with the hydraulic passage 73 is opened and closed by the valve member 63 in response to the operation of the piston 62.

When the hydraulic pressure of the second pressure chamber 16 exceeds the output hydraulic pressure of the hydraulic booster 20, the hydraulic passage 64 is closed by the piston 62 and the hydraulic passage 73 is interrupted. Thereby, the third pressure chamber 30 is in the sealed condition and the hydraulic pressure of the third pressure chamber 30 is held at the hydraulic pressure existing when the hydraulic passage 73 is interrupted. Accordingly, the relative movement between the second piston 15 and the third piston 19 does not occur and the above sense of incongruity is not generated in the brake pedal 2.

Now, in the present invention, it is possible to substitute the normal-open electromagnetic valve which is disposed in the hydraulic passage 73 and is controlled in response to the difference between the static hydraulic pressure and the dynamic hydraulic pressure for differential pressure valve 60. If this kind of electromagnetic valve is used, it is able to suitably select the function as the above differential pressure valve 60 in response to necessity.

According to the present invention, since the output hydraulic pressure of the dynamic hydraulic pressure generator is supplied to the third pressure chamber, it is possible to reduce the initial stroke of the brake pedal 2 and it is also possible to ensure the braking force by operating as the ordinary tandem master cylinder when the dynamic hydraulic pressure generator is not operated. Even though the leakage of brake fluid may occur in the wheel cylinders communicated with the second pressure chamber, since these wheel cylinders are fluidly interrupted from the dynamic hydraulic pressure generator via the second piston, the flow of the brake fluid from the dynamic hydraulic pressure generator is prevented and it is possible to ensure the normal function of the dynamic hydraulic pressure generator.

Furthermore, the hydraulic braking system includes the valve means for opening and closing the communication between the dynamic hydraulic pressure generator and the third pressure chamber. Thus, since the third pressure chamber is in a sealed condition when the hydraulic pressure of the second pressure chamber is larger than the output hydraulic pressure of the dynamic hydraulic pressure generator, it is possible to hold the hydraulic pressure of the third pressure chamber and it is also possible to continue the braking operation without generating the sense of incongruity.

What is claimed:

1. A hydraulic braking system comprising:
   a tandem master cylinder having a bore with an opening and a closed wall at opposite ends thereof, a first piston slidably fitted in the bore and operatively connected to a brake pedal, a second piston slidably fitted in the bore and operatively connected to the first piston, a first pressure chamber and a second pressure chamber defined in the bore by the first piston and the second piston, the first and second pressure chambers being adapted to output a braking pressure upon a decrease in volume in the respective first and second chambers that occurs when the first and second pistons slide in response to operation of the brake pedal,
   a power source for generating hydraulic power pressure,
   a dynamic hydraulic braking pressure generator which introduces the hydraulic power pressure output from the power source and regulates the output hydraulic pressure in response to operation of the brake pedal,
   a plurality of wheel cylinders for braking respective road wheels and divided into a first group of wheel brake cylinders communicated with the first pressure chamber through one hydraulic circuit and a second group of wheel brake cylinders communicated with the second pressure chamber through another hydraulic circuit, and
   a third piston slidably fitted between the first piston and the second piston in the bore so as to define a third pressure chamber communicated with the dynamic hydraulic braking pressure generator and located between the third piston and the second piston, said tandem master cylinder including limiting means for limiting the amount of movement of the third piston toward the first piston in response to the output pressure of the dynamic hydraulic braking pressure generator.

2. A hydraulic braking system as recited in claim 1, wherein the third pressure chamber is expanded toward the first piston and the second piston in response to the output hydraulic pressure of the dynamic hydraulic braking pressure generator.

3. A hydraulic braking system as recited in claim 2, wherein the second piston and the third piston are disposed so as to abut each other in an initial piston.

4. A hydraulic braking system as recited in claim 1, including valve means for controlling the communication between the dynamic hydraulic braking pressure generator and the third pressure chamber.

5. A hydraulic braking system as recited in claim 4, wherein the valve means interrupts the communication between the dynamic hydraulic pressure generator and the third pressure chamber when the hydraulic pressure of the second pressure chamber is larger than the output hydraulic pressure of the dynamic hydraulic pressure generator.

6. A hydraulic braking system as recited in claim 5, wherein the valve means is a differential pressure valve having a piston slidably disposed in a cylinder, a spherical shaped valve member formed on one end of the piston, a first valve chamber defined between an opposite end of the piston and the cylinder and communicated with the second pressure chamber, and a second valve chamber defined between the one end of the piston and the cylinder and communicated with the dynamic hydraulic pressure generator and the third pressure chamber, the differential pressure valve being normally open and the communication between the third pressure chamber and the dynamic hydraulic pressure generator being controlled by the valve member in response to operation of the piston.

7. A hydraulic braking system as recited in claim 1, wherein the dynamic hydraulic pressure generator includes a hydraulic booster having a housing defining a boost chamber communicated with the power source through a power passage and communicated with the reservoir through a draining passage, a hydraulic pressure control valve disposed within the boost chamber and connected to the power passage and the drain passage, the hydraulic pressure control valve being arranged to control the communication of the boost chamber with the power passage and the drain passage in response to operation of the brake pedal to control the hydraulic power pressure supplied from the power source and thereby generate a regulated hydraulic pressure in the boost chamber, the boost chamber normally communicating with the drain passage when the brake pedal is in an initial position thereof and a power piston axially movably disposed within the housing so as to have the regulated hydraulic pressure in the boost chamber applied thereto.

8. A hydraulic braking system as recited in claim 1, wherein said second and third pistons move in opposite directions away from one another when hydraulic power pressure is supplied to the third pressure chamber upon operation of the brake pedal.

9. A hydraulic braking system as recited in claim 1, including a first fluid chamber defined in the bore by the first piston, said first fluid chamber being in communication with a fluid reservoir and being alternately in communication and out of communication with the first pressure chamber in response to sliding movement of the third piston.

10. A hydraulic braking system as recited in claim 9, including a second fluid chamber defined in the bore by the second piston, said second fluid chamber being in communication with the fluid reservoir and being alternately in communication and out of communication with the second pressure chamber in response to sliding movement of the second piston.

* * * * *